United States Patent [19]

Blocker

[11] 4,113,284
[45] Sep. 12, 1978

[54] CONNECTION FITTING

[76] Inventor: William C. Blocker, 1406 N. Butler Ave., Indianapolis, Ind. 46218

[21] Appl. No.: 783,054

[22] Filed: Mar. 30, 1977

[51] Int. Cl.² .............................................. F16L 55/00
[52] U.S. Cl. ..................................... 285/14; 137/314; 285/93; 285/334.4; 285/393
[58] Field of Search ................... 285/13, 93, 14, 332.1, 285/334.4, 393; 137/312, 15, 313, 314; 222/108; 210/165

[56] References Cited

U.S. PATENT DOCUMENTS

| | | | |
|---|---|---|---|
| 1,497,652 | 6/1924 | Browne | 285/13 |
| 1,801,845 | 4/1931 | Burton | 285/14 |
| 2,542,877 | 2/1951 | Newcum | 285/13 |
| 2,679,411 | 5/1954 | Moore | 285/14 |
| 2,688,500 | 9/1954 | Scott | 285/13 |
| 3,249,119 | 5/1966 | Pollock | 285/14 X |
| 3,489,435 | 1/1970 | Weber et al. | 285/13 |
| 3,947,942 | 4/1976 | Blocker | 137/15 |

Primary Examiner—Dave W. Arola
Attorney, Agent, or Firm—Woodard, Weikart, Emhardt & Naughton

[57] ABSTRACT

A fitting for connection between two locations in a transfer system whereby fluid or gaseous substances pass from one point to another through the fitting. The fitting comprises a hollow cylinder, a hollow stem with an enlarged bullet-shaped head and slidably extending through the cylinder, a passageway providing an escape path of least resistance to leaks occurring between the bullet-shaped head and corresponding fitting in a unit into which it is placed and an annular depression at one end of the hollow cylinder, at which leaks can be detected and, if desired, a leak-test location label can be applied. The hollow stem includes a circumferential groove which is located adjacent to the annular depression, the combination providing a means for retention of leak-test solution.

9 Claims, 11 Drawing Figures

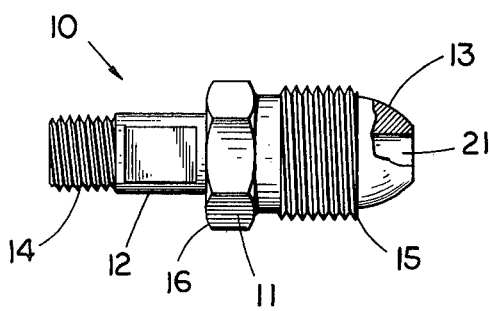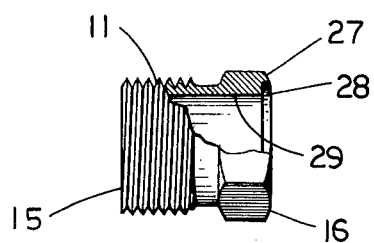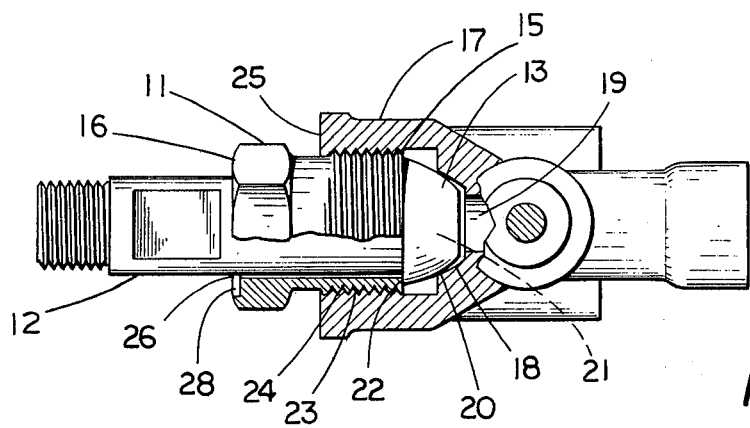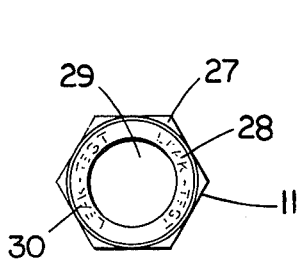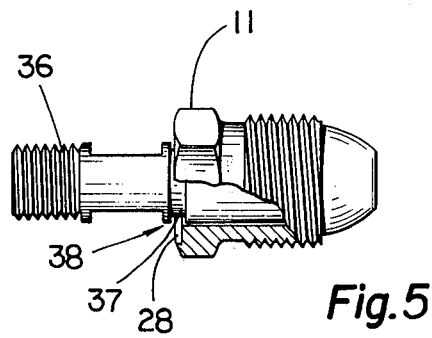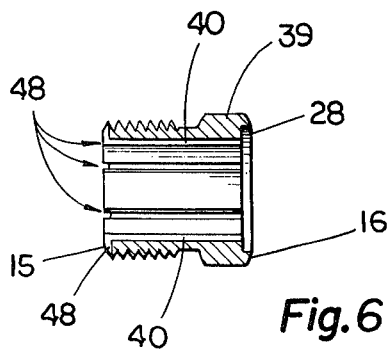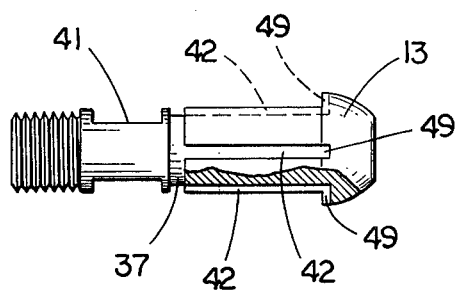

CONNECTION FITTING

BACKGROUND OF THE INVENTION

1. Field of the Invention

This invention relates in general to systems in which substances are transferred from one location to another and to the fitting which connects those two locations and through which a substance flows. More specifically, this invention relates to LP gas cylinder valves.

2. Description of the Prior Art

Systems which transfer fluid or gaseous substances from one point to another, normally employ some type of fitting for connecting the outlet aperture of a storage container to the inlet of the point of usage. Such fittings may be designed as valves for metering control or as male-female adaptors for straight connecting applications.

Typical of such a connection fitting is one which includes an externally-threaded hollow cylinder and a hollow stem with an enlarged, bullet-shaped head, slidably extending through said cylinder. The cylinder will be threadedly received by the outlet aperture of the container and when tightened into position, the bullet-shaped head of the stem is forced into sealing engagement with the outlet aperture. If the sealing engagement is complete, substances will only flow through the hollow stem and not around the bullet-shaped head. An LP gas valve and LP gas tank are typical examples of the connecting structure just described, and Blocker, U.S. Pat. No. 3,947,942 discloses the structure of such a valve in detail.

Due in part to sealing imperfections with either soft or hard nose designs, as well as to internal pressures, the substance, especially when gaseous in nature, may leak to the atmosphere rather than be transferred through the connection. The passageway for such a leak may be between the hollow cylinder and the hollow stem or it may be between the threaded connection of the cylinder and the outlet aperture. Depending upon the type of substance being transferred and the particular application, it may be necessary to determine if the fitting is leaking. Under the situation just described, detection of such a leak would require application of a leak-test solution at two different locations. There are several designs for couplings and fittings which include leak-directing passageways for channeling the leaks to a single location. Brown, U.S. Pat. No. 1,497,652 and Weber, U.S. Pat. No. 3,489,435 disclose two such designs. There are disadvantages with such devices in that the location of where to test for leaks is not readily apparent nor is there a convenient procedure for applying the leak-test solution and retaining the solution at the test location. If there is a slow leak, this solution may run off or evaporate before detection can be made.

SUMMARY OF THE INVENTION

One embodiment of the present invention is a fitting for connecting to a container of a system whereby a substance is transferable in either direction through the fitting. The fitting comprises an externally-threaded, hollow cylinder; a hollow stem with an enlarged, bullet-shaped head and slidably extending through the hollow cylinder; a passageway from one end to the opposite end of the cylinder providing an escape path of least resistance to leaks occurring between the enlarged head and a corresponding fitting in a unit into which it is placed; and means for the retention of leak-test solution. The means includes a recessed area at one end of the hollow cylinder adjacent to the point of exit to the atmosphere of the passageway.

Another embodiment of the present invention is the fitting which has been described in which the means includes a circumferential groove on the stem adjacent one end of the hollow cylinder and adjacent the point of exit to the atmosphere of the passageway.

Yet another embodiment of the present invention is the combination of a holding tank for liquid petroleum, having an internally-threaded outlet aperture, and a liquid petroleum valve assembly. The valve assembly comprising a hollow cylinder, having a first and second end, externally-threaded at the first end, and having a hexagonally-shaped nut integrally formed on the second end; a hollow stem with an enlarged, bullet-shaped head and slidably extending through the hollow cylinder, and extending out from either end of the cylinder; a passageway between the two ends of the cylinder providing an escape path of least resistance to leaks occurring between the head and outlet aperture; and means for the retention of leak-test solution. The means includes an annular depression at the second end of the cylinder and concentric in location to the stem and a circumferential groove on the stem located adjacent to the annular depression.

It is an object of this invention to provide means for the retention of leak-test solution at the leak-test location so that slower leaks can be detected before the solution runs off or evaporates.

It is also an object of this invention to provide a structure for the application of a leak-test location label so that the operator will know at which location to test for leakage.

Related objects and advantages of the present invention will be apparent from the following description.

BRIEF DESCRIPTION OF THE DRAWINGS

FIG. 1 is a fragmentary top view of a fitting assembly showing the inner and outer members as they are positioned relative to each other.

FIG. 2 is an enlarged fragmentary top view of the fitting of FIG. 1 threadedly received by an internally-threaded outlet aperture of a storage container.

FIG. 3 is a fragmentary top view of the outer, externally-threaded, hollow, cylindrical member of the FIG. 1 fitting.

FIG. 4 is a plan view of the FIG. 3 member detailing a recessed area and the application of a leak-test-location label.

FIG. 5 is a fragmentary side view of the FIG. 1 fitting showing a circumferential groove on the inner member.

FIG. 6 is a cross-sectional view of the member shown in FIG. 3 and showing groove means as part of the interior of the outer cylindrical member.

FIG. 7 is a fragmentary side view of the inner member of FIG. 5 showing groove means as part of the exterior of the member.

DESCRIPTION OF THE PREFERRED EMBODIMENTS

Figure 8:
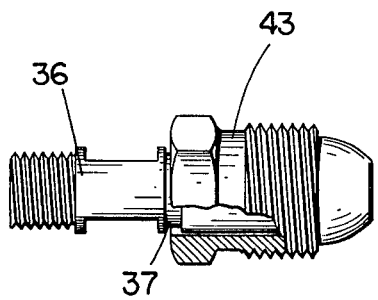
FIG. 8 is the same view as FIG. 5 showing the sole means for retention of leak-test solution as a circumferential groove on the inner member.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One preferred embodiment of the present invention is represented by FIGS. 1-4. FIG. 1 is a fragmentary top view of a fitting 10 adapted for connecting between two locations in a transfer system. The fitting 10 is comprised of two members, a hollow cylinder 11 and a hollow stem 12 which is slidably received by the cylinder 11. The stem 12 is longer than the cylinder 11 and extends out from either end of the cylinder 11. At one end of the stem 12 is an enlarged, bullet-shaped head 13; the opposite end 14 thereof being adapted for connecting to another fitting, adaptor, or tubing. The particular construction of end 14 is not critical so long as means for connecting are provided. The first end 15 of cylinder 11 is externally threaded while the second end 16 has means, such as a hexagonal-shaped end, for tightening the cylinder into the unit into which it is placed.

FIG. 2 is an enlarged, fragmentary top view of fitting 10 threadedly received by outlet aperture 17. The outlet aperture 17 represents a female connection of a container from which liquids or gases are transferred to another location. A typical type of outlet aperture is that of a valve assembly whereby the flow out of the container can be controlled. The aperture 17 has a tapered seat 18 against which the bullet-shaped head 13 of the stem is drawn into engagement as the cylinder 11 is tightened into position. Once the cylinder 11 is tightened into position, the bullet-shaped head 13 will seal the area of contact 20 between head 13 and tapered seat 18 so that the transfer of any substance from the container through the outlet passage 19 of aperture 17 will be through the hollow portion 21 of stem 12 and will not escape around the bullet-shaped head 13 between the head 13 and aperture 17. Stem 12 has a passageway extending through the length thereof and is shown as hollow portion 21. Stem 12 is disclosed in U.S. Pat. No. 3,947,942, which is hereby incorporated by reference.

Due to various factors, such as internal pressure of the container, the operating environment, the uniformity of the bullet-shaped head 13 and tapered seat 18, and the degree of tightening of cylinder 11 into aperture 17; voids may develop in the area of contact 20 thereby allowing the substance within the container to leak to the atmosphere. With conventional fittings, this leakage to the atmosphere will follow one of two paths. One path would be between cylinder 11 and stem 12. This path begins at the interface 22 of the first end 15 of cylinder 11 and the bullet-shaped head 13, and ends at the second end 16 of cylinder 11, at which location the leak would be detectable. The other path would be between the internal threads 23 of the outlet aperture and the external threads 24 of cylinder 11, this path ends at the end 25 of the outlet aperture 17 and would be detectable at that location.

The present invention avoids the possibility of two different leak paths by incorporating a passageway 26 between cylinder 11 and stem 12. Passageway 26 provides an escape path of least resistance causing all leaks to exit to the atmosphere at a single location. Passageway 26 extends through interface 22 and then between stem 12 and cylinder 11, whereby the single location of exit to the atmosphere is at the face 27 of the second end 16 (FIG. 3). Passageway 26 extends through interface 22 in a variety of ways, such as to be described for FIGS. 6, 7, 10 and 11.

The conventional method of checking for leakage is to apply a solution, such as soapy water, over the surface to be checked and to watch for bubbles to break through the liquid. Unfortunately, with slow, low-pressure leaks, the solution often runs off of the surface or evaporates before bubbles can form. The present invention reduces this problem by incorporating means for the retention of leak-test solution at the location where the leakage exits to the atmosphere. This means includes a recessed area 28 on face 27 of the second end 16 of cylinder 11 (Ref. FIGS. 3 and 4). This recessed area 28 permits a greater amount of fluid to be retained inasmuch as area 28 acts as a reservoir to reduce the amount of run-off. FIG. 4 is a plan view of cylinder 11 showing recessed area 28 as being annular and generally concentric to the axis of hollow portion 29 of cylinder 11 (Ref. FIG. 3). Recessed area 28 also provides a structure whereby a leak-test-location instructional label 30 can be applied. This recessed area prevents such a label from being rubbed or peeled off and aids the user by specifically indicating at what location to test for leakage.

A second embodiment of the present invention is represented by FIG. 5 which shows a fragmentary side view of stem 36 and cylinder 11. Stem 36 is similar to stem 12 in all respects except that stem 36 has a circumferential groove 37 which is adjacent to recessed area 28. This adjacent combination of groove 37 and area 28 provides an improved annular reservoir 38 whereby the time of retention for any leak-test solution will be increased over that of area 28 acting alone. By actually allowing the leak-test solution to flow between the cylinder 11 and stem 36 virtually any leakage will be able to be detected.

A third embodiment of the present invention is represented in part by FIG. 6 which shows a cross-sectional view of hollow cylinder 39 which is identical to the cylinder of FIG. 3 except grooves 40 have been added. Grooves 40 extending from radial slots 48 at first end 15 to second end 16 of cylinder 39 provide the passageway 26 from the interface 22 (Ref. FIG. 2) to recessed area 28, for leaks occurring between bullet-shaped head 13 and tapered seat 18 (Ref. FIG. 2). Grooves 40 are provided on the interior surface of cylinder 39 which surrounds stem 12.

Figure 10:
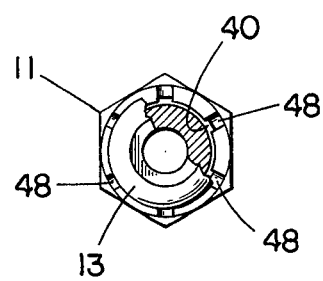
FIG. 10 is a fragmentary end view of the FIG. 6 cylinder and FIG. 1 stem assembly.

FIG. 10 shows a fragmentary end view of cylinder 39 as it assembles with either stem 12 or stem 36 to form a fitting according to the present invention. Bullet-shaped head 13 rests against first end 15 of cylinder 39. Radial slots 48 extend from grooves 40 radially outward on end 15 to allow the passage of leaks through interface 22 (Ref. FIG. 2). Since head 13 of stem 12 or 36 does not completely close off the opening provided by slots 48 in conjunction with grooves 40, any leakage which occurs at an area of contact 20 (Ref. FIG. 2) will readily pass along slots 48 and grooves 40 between cylinder 11 and stem 12.

Figure 11:
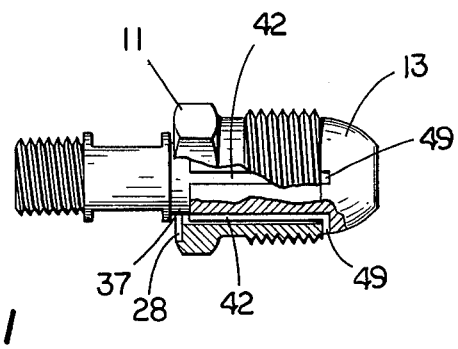
FIG. 11 is a fragmentary side view of the FIG. 7 stem and FIG. 3 cylinder assembly.

A fourth embodiment of the present invention is represented in part by FIG. 7 which shows a fragmentary side view of a stem 41 which is identical to the stem of FIG. 5 to which grooves 42 have been added. Grooves 42 extending from bullet-shaped head 13 to circumferential groove 37 provide the passageway 26 from the interface 22 (Ref. FIG. 2) to recessed area 28, for leaks occurring between bullet-shaped head 13 and tapered seat 18 (Ref. FIG. 2). Grooves 42 are provided on the exterior surface of stem 41 which is surrounded by cylinder 11. FIG. 11 shows a fragmentary side view of stem 41 as it assembles with cylinder 11 to form a fitting according to the present invention. Grooves 42 are joined to recessed end portions 49 to form a continuous passageway through interface 22 and between cylinder 11 and stem 41.

Another embodiment of the present invention is represented by FIG. 8 which shows a side view of the assembly of cylinder 43 and stem 36. In this embodiment, the means for retention of leak-test solution includes only circumferential groove 37 of stem 36. Cylinder 43 is identical to cylinder 11 except cylinder 43 does not have a recessed area 28 at end 16 adjacent to groove 37.

Figure 9:
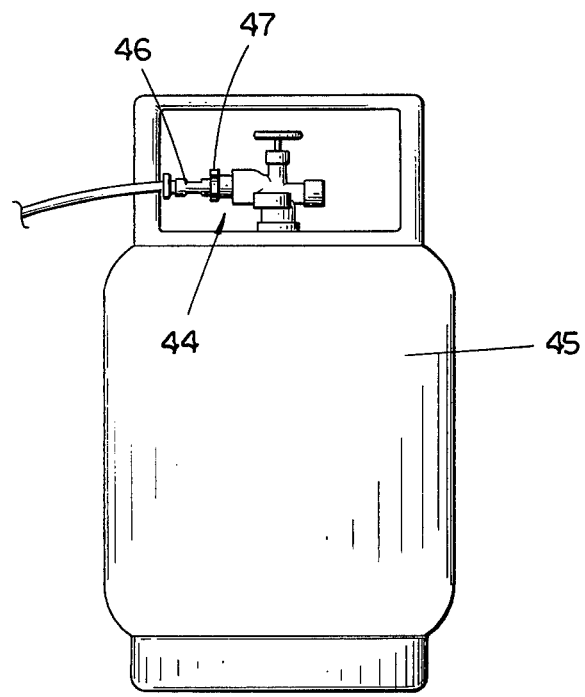
FIG. 9 is a side view of an LP gas valve and tank combination incorporating the present invention.

A final embodiment of the present invention is represented by the FIG. 9 combination of LP valve 44 and tank 45. In this embodiment, valve 44 comprises inner member 46 and outer member 47 with a passageway between said members providing an escape path of least resistance to leaks. Inner member 46 having an enlarged, bullet-shaped head at one end and externally threaded at the opposite end. Outer member 47 being externally threaded at one end with a hexagonally-shaped nut formed on the opposite end. The operation and further description of valve 44 is represented by the embodiment of FIG. 5. Inner member 46 may be, for example, stems 36 or 41 shown in FIGS. 5 and 7 whereas outer member 47 may be, for example, cylinders 11 and 39 shown in FIGS. 3 and 6.

Although the various embodiments which have been described disclose a hard-nosed stem (referring to bullet-shaped head 13), any of these embodiments may also be used with a soft-nosed stem as disclosed in Blocker, U.S. Pat. No. 3,947,942 which is hereby incorporated by reference.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A fitting for connecting to an aperture of a container of a system whereby a substance is transferable in either direction through said fitting, which comprises:
    a hollow cylinder having a first end and a second end, said first end being externally threaded and adapted to be received in the aperture;
    a stem member having a bore extending therethrough and an enlarged head portion at its first end, said stem member being longer than said cylinder and slidably extending therethrough and extending out from either end of said cylinder, said head portion adapted to abut said first end of said hollow cylinder when said cylinder is received in the aperture;
    first means between the first and second end of said cylinder operable to provide an escape path of least resistance to any leaks occurring between said head portion and a corresponding aperture in a container into which said fitting is placed, said head portion being designed to substantially close off said aperture by interfacing therewith; and
    second means for the retention of leak-test solution, said means includes a recessed area at the second end of said hollow cylinder and adjacent to the point of exit to the atmosphere of said first means.

2. The fitting of claim 1 in which said recessed area is an annular depression concentric in location to said stem member.

3. The fitting of claim 2 in which said second means for the retention of leak-test solution further includes a circumferential groove on said stem member located adjacent said annular depression.

4. The fitting of claim 1 in which said first means includes a passageway of at least one longitudinal groove.

5. The fitting of claim 1 in which said first means includes a passageway of at least one groove as part of said hollow cylinder extending between the first and second ends.

6. The fitting of claim 1 in which said first means includes a passageway of at least one groove as part of said stem member extending between said head portion and a location adjacent to the cylinder said end.

7. A fitting for connecting to an aperture of a container of a system whereby a substance is transferable in either direction through said fitting, which comprises:
    a hollow cylinder having a first end and a second end, said first end being externally threaded and adapted to be received in the aperture;
    a stem member having a bore extending therethrough and an enlarged head portion at its first end, said stem member being longer than said cylinder and slidably extending therethrough and extending out from either end of said cylinder, said head portion adapted to abut said first end of said hollow cylinder when said cylinder is received in the aperture;
    first means between the first and second end of said cylinder operable to provide an escape path of least resistance to any leaks occurring between said head portion and a corresponding aperture in a container into which said fitting is placed, said head portion being designed to substantially close off said aperture by interfacing therewith; and
    second means for the retention of leak-test solution, said means includes a circumferential groove of said stem member located adjacent the second end of said hollow cylinder.

8. The fitting of claim 2 wherein said second means at said recessed area include instruction means located thereat, operable to locate a leak and test area.

9. The combination of:
    a holding tank for liquid petroleum, having an internally-threaded outlet aperture; and
    a liquid petroleum valve assembly comprising:
    a hollow cylinder having a first end and a second end, said first end being externally threaded, said second end having a hexagonally-shaped nut integrally formed thereon, said cylinder threadedly received by said outlet aperture;
    a stem member having a bore extending therethrough and an enlarged head portion at its first end, said stem member being longer than said cylinder and slidably extending therethrough and extending out from either end of said cylinder, said head portion adapted to abut said first end of said hollow cylinder when said cylinder is received in the aperture; said head portion being contiguous with said cylinder first end and the second end of said stem being externally threaded;

first means between the first and second end of said cylinder providing an escape path of least resistance to any leaks occurring between said head and said outlet aperture, said head portion being designed to substantially close off said aperture by interfacing therewith; and second means for the retention of leak-test solution, said means includes an annular depression at the second end of said hollow cylinder and concentric in location to said stem member and a circumferential groove on said stem member located adjacent said annular depression.

* * * * *

UNITED STATES PATENT AND TRADEMARK OFFICE
CERTIFICATE OF CORRECTION

PATENT NO. : 4,113,284
DATED : September 12, 1978
INVENTOR(S) : William C. Blocker It is certified that error appears in the above–identified patent and that said Letters Patent are hereby corrected as shown below:

"In column 6, line 29, after the word cylinder replace "said" with --second--."

"In column 6, line 51, after the word groove replace "of" with --on--."

Signed and Sealed this

Seventh Day of November 1978

[SEAL]

Attest:

RUTH C. MASON
*Attesting Officer*

DONALD W. BANNER
*Commissioner of Patents and Trademarks*